(12) United States Patent
Yan (10) Patent No.: US 10,923,129 B2
(45) Date of Patent: Feb. 16, 2021

(54) METHOD FOR PROCESSING SIGNALS, TERMINAL DEVICE, AND NON-TRANSITORY READABLE STORAGE MEDIUM

(71) Applicant: Guangdong Oppo Mobile Telecommunications Corp., Ltd., Guangdong (CN)

(72) Inventor: Bixiang Yan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 170 days.

(21) Appl. No.: 16/246,768

(22) Filed: Jan. 14, 2019

(65) Prior Publication Data

US 2019/0304467 A1 Oct. 3, 2019

(30) Foreign Application Priority Data

Mar. 30, 2018 (CN) .......................... 2018 1 0277815

(51) Int. Cl.
*G10L 17/00* (2013.01)
*G10L 17/02* (2013.01)
(Continued)

(52) U.S. Cl.
CPC .............. *G10L 17/00* (2013.01); *G10L 17/02* (2013.01); *G10L 17/06* (2013.01); *G10L 25/84* (2013.01);
(Continued)

(58) Field of Classification Search
CPC ......... G10L 17/00; G10L 17/02; G10L 25/84; G10L 17/06; G10L 25/51; H04R 1/1016;
(Continued)

(56) References Cited

U.S. PATENT DOCUMENTS 9,961,435 B1 * 5/2018 Goyal ..................... G10L 25/84
2010/0290632 A1 * 11/2010 Lin ....................... G01S 3/8006
381/56

(Continued)

FOREIGN PATENT DOCUMENTS

CN 102411936 A 4/2012
CN 102411936 B 11/2012
(Continued)

OTHER PUBLICATIONS

Extended European search report issued in corresponding European application No. 19155443.5 dated Aug. 9, 2019.
(Continued)

*Primary Examiner* — Yogeshkumar Patel (57) ABSTRACT

A method for processing signals, a terminal device, and a non-transitory readable storage medium are provided. The method includes the following operations. A sound signal of external environment is collected via an electroacoustic transducer of a headphone when a user talks through the headphone. Feature audio of the sound signal is identified and whether the feature audio matches a preset sound model is determined. The user is reminded in a preset reminding manner corresponding to the feature audio based on a determination that the feature audio matches the preset sound model.

12 Claims, 6 Drawing Sheets

(51) Int. Cl.
  *G10L 17/06* (2013.01)
  *G10L 25/84* (2013.01)
  *H04R 1/10* (2006.01)
  *H04R 3/00* (2006.01)
  *G10L 25/51* (2013.01)

(52) U.S. Cl.
  CPC ............ *H04R 1/1016* (2013.01); *G10L 25/51* (2013.01); *H04R 1/1083* (2013.01); *H04R 3/00* (2013.01); *H04R 2201/107* (2013.01); *H04R 2410/05* (2013.01)

(58) Field of Classification Search
  CPC ........ H04R 3/00; H04R 3/005; H04R 1/1083; H04R 2460/01; H04R 2410/05; H04R 2201/107; H04R 2205/022; H04R 1/406; H04M 3/568; H04M 1/6058
  See application file for complete search history.

(56) References Cited

U.S. PATENT DOCUMENTS

| | | | | |
|---|---|---|---|---|
| 2013/0170665 | A1* | 7/2013 | Wise | H04R 1/1041 381/77 |
| 2015/0098571 | A1* | 4/2015 | Jarvinen | H04S 7/302 381/1 |

FOREIGN PATENT DOCUMENTS

| | | |
|---|---|---|
| CN | 103414982 A | 11/2013 |
| CN | 101790000 B | 8/2014 |
| CN | 104158970 A | 11/2014 |
| CN | 204231608 U | 3/2015 |
| CN | 105741856 A | 7/2016 |
| CN | 106162413 A | 11/2016 |
| CN | 106210219 A | 12/2016 |
| CN | 106210960 A | 12/2016 |
| CN | 107105367 A | 8/2017 |
| CN | 107799117 A | 3/2018 |
| CN | 108600885 A | 9/2018 |
| WO | 2008062854 A1 | 5/2008 |
| WO | 2008095167 A2 | 8/2008 |
| WO | 2012069020 A1 | 5/2012 |
| WO | 2017010609 A1 | 1/2017 |
| WO | 2017171137 A1 | 10/2017 |

OTHER PUBLICATIONS

International search report issued in corresponding international application No. PCT/CN2019/074447 dated Apr. 28, 2019.
"Essays of the China 3D TV", edited by Gao Xiaohong and Wang Fu; Publication date: Nov. 30, 2014; p. 283.
"Human-machine safety engineering for Underground tire mining vehicle", edited by Gao Mengxiong; Publication date: Oct. 31, 2012; p. 215.
Examination report issued in corresponding in application No. 201914004510 dated Aug. 2, 2020.
English Translation The first office action issued in corresponding CN application No. 201810277815.2 dated Jul. 4, 2019.
English Translation The second office action issued in corresponding CN application No. 201810277815.2 dated Oct. 8, 2019.
English Translation Rejection issued in corresponding CN application No. 201810277815.2 dated Dec. 2, 2019.

* cited by examiner

METHOD FOR PROCESSING SIGNALS, TERMINAL DEVICE, AND NON-TRANSITORY READABLE STORAGE MEDIUM

CROSS-REFERENCE TO RELATED APPLICATION(S)

This application claims priority to Chinese Application Patent Serial No. 201810277815.2, filed on Mar. 30, 2018, the entire disclosure of which is hereby incorporated by reference.

TECHNICAL FIELD

This disclosure relates to the technical field of communications, and more particularly to a method for processing signals, a terminal device, and a non-transitory readable storage medium.

BACKGROUND

With the development of intellectualization of communication devices, people use smart terminals increasingly frequently in daily lives. Through a smart terminal, a user can conduct a variety of activities such as video communication, calling, voice communication, music listening, and video playing. At the same time, as a tool to transmit sound, headphones give people a different sense of hearing. The headphones are widely used in people's daily lives. The user can conduct a variety of activities such as music listening, calling, voice communication, video communication, and video playing through the headphones. In more and more occasions, people like to wear the headphones, and the sound insulation and noise reduction effect of the headphones are getting better.

When the user wears the headphone to listen to music or to call, a sound signal of external environment is isolated, this makes it hard for the user to hear reminding sound or a shout, such as horn of an automobile and a shout of an acquaintance. Even if the user hears the reminding sound, it is hard to judge where the reminding sound is made. Therefore, when the user wears the headphone, he or she needs to be distracted by surrounding environment, which may cause inconvenience to the user.

SUMMARY

Implementations of the present disclosure provide a method for processing signals, a terminal device, and a non-transitory readable storage medium.

A method for processing signals is provided. The method includes the following.

A sound signal of external environment is collected via an electroacoustic transducer of a headphone when a user talks through the headphone. Feature audio of the sound signal is identified and whether the feature audio matches a preset sound model is determined. Remind the user in a preset reminding manner corresponding to the feature audio based on a determination that the feature audio matches the preset sound model.

A terminal device is provided. The terminal device includes at least one processor and a computer readable storage. The computer readable storage is coupled to the at least one processor and stores at least one computer executable instruction thereon which, when executed by the at least one processor, cause the at least one processor to carry out actions, including: collecting, via an electroacoustic transducer of a headphone, a sound signal of external environment when a user talks through the headphone; identifying feature audio of the sound signal and determining whether the feature audio matches a preset sound model; reminding the user in a preset reminding manner corresponding to the feature audio based on a determination that the feature audio matches the preset sound model.

A non-transitory computer-readable storage medium is provided. The computer readable storage medium is configured to store a computer program which, when executed by a processor, causes the processor to carry out actions, including: collecting, via an electroacoustic transducer of a headphone, a sound signal of external environment when a user talks through the headphone; identifying feature audio of the sound signal and determining whether the feature audio matches a preset sound model; reminding the user in a preset reminding manner corresponding to the feature audio based on a determination that the feature audio matches the preset sound model.

BRIEF DESCRIPTION OF DRAWINGS

To illustrate the technical solutions embodied by the implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely herein-after with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

All technical and scientific terms used herein have the same meaning as commonly understood by the ordinary skill in the art to which this disclosure applies, unless otherwise defined. The terminology used herein is for the purpose of describing particular implementations, and is not intended to be limiting. It will be understood that the terms "first", "second" and the like, as used herein, may be used to describe various components, but these components are not limited by these terms. These terms are only used to distinguish one component from another. For example, a first application may be referred to as a second application without departing from the scope of the present disclosure, and similarly, the second application may be the first application. Both the first application and the second application are applications, but they are not the same application.

Disclosed herein are implementations of a method for processing signals, including: collecting, via an electroacoustic transducer of a headphone, a sound signal of external environment when a user talks through the headphone; identifying feature audio of the sound signal and determining whether the feature audio matches a preset sound model; reminding the user in a preset reminding manner corresponding to the feature audio based on a determination that the feature audio matches the preset sound model.

As an implementation, the electroacoustic transducer includes a second microphone configured to collect a voice signal from the user and at least one speaker configured to play an audio signal. The collecting, via the electroacoustic transducer of the headphone, a sound signal of external environment when a user talks through the headphone includes: collecting, by the at least one speaker of the headphone, the sound signal of the external environment, when the user talks through the headphone.

As an implementation, the electroacoustic transducer includes a second microphone configured to collect a voice signal from the user, at least one speaker configured to play an audio signal, and a first microphone close to the at least one speaker of the headphone. The collecting, via the electroacoustic transducer of the headphone, a sound signal of external environment when a user talks through the headphone includes: collecting, by the first microphone of the headphone, the sound signal of the external environment, when the user talks through the headphone.

As an implementation, the method further includes: denoising the voice signal from the user collected by the second microphone according to the sound signal of the external environment.

As an implementation, the identifying feature audio of the sound signal and determining whether the feature audio matches a preset sound model includes at least one of: extracting noise information in the sound signal and determining whether the noise information matches a preset noise model; extracting voiceprint information in the sound signal and determining whether the voiceprint information matches a sample voiceprint information; and extracting sensitive information in the sound signal, determining whether the sensitive information matches a preset keyword.

As an implementation, the reminding the user in a preset reminding manner corresponding to the feature audio includes: determining the preset reminding manner corresponding to the feature audio according to a correspondence between feature audio and preset reminding manners, the preset reminding manner including at least one of preset reminder content display-remind, vibration-remind, display-remind, and simulation-remind; and reminding the user in the preset reminding manner determined.

As an implementation, the at least one speaker includes a first speaker and a second speaker, and the method further includes: acquiring a sound signal collected by the second microphone, the first speaker, and the second speaker of the headphone; acquiring location information of the sound signal relative to the headphone according to time delays of receiving the sound signal by the second microphone, the first speaker, and the second speaker; reminding the user according to the location information.

As an implementation, the acquiring location information of the sound signal relative to the headphone according to time delays of receiving the sound signal by the second microphone, the first speaker, and the second speaker includes: acquiring three time delays by using the second microphone, the first speaker, and the second speaker respectively as a reference microphone; acquiring an average time delay according to the tree time delays; estimating the location information of the sound signal according to the average time delay and acquiring the location information of the sound signal relative to the headphone.

As an implementation, the at least one speaker includes a first speaker and a second speaker, and the method further includes: acquiring a sound signal collected by the first microphone, the first speaker, and the second speaker of the headphone; acquiring location information of the sound signal relative to the headphone according to time delays of receiving the sound signal by the first microphone, the first speaker, and the second speaker; and reminding the user according to the location information.

As an implementation, the acquiring location information of the sound signal relative to the headphone according to time delays of receiving the sound signal by the first microphone, the first speaker, and the second speaker includes: acquiring three time delays by using the first microphone, the first speaker, and the second speaker respectively as a reference microphone; acquiring an average time delay according to the tree time delays; estimating the location information of the sound signal according to the average time delay and acquiring the location information of the sound signal relative to the headphone.

Disclosed herein are implementations of a terminal device, including: at least one processor; and a computer readable storage, coupled to the at least one processor and storing at least one computer executable instruction thereon which, when executed by the at least one processor, cause the at least one processor to carry out actions, including: collecting, via an electroacoustic transducer of a headphone, a sound signal of external environment when a user talks through the headphone; identifying feature audio of the sound signal and determining whether the feature audio matches a preset sound model; and reminding the user in a preset reminding manner corresponding to the feature audio based on a determination that the feature audio matches the preset sound model.

As an implementation, the electroacoustic transducer includes a second microphone configured to collect a voice signal from the user and at least one speaker configured to play an audio signal; and the at least one processor carrying out the action of collecting, via the electroacoustic transducer of the headphone, the sound signal of external environment when a user talks through the headphone is caused to carry out actions, including: collecting, by the at least one speaker of the headphone, the sound signal of the external environment, when the user talks through the headphone.

As an implementation, the electroacoustic transducer includes a second microphone configured to collect a voice signal from the user, at least one speaker configured to play an audio signal, and a first microphone close to the at least one speaker of the headphone; and the at least one processor carrying out the action of collecting, via the electroacoustic transducer of the headphone, the sound signal of external environment when the user talks through the headphone is caused to carry out actions, including: collecting, by the first microphone of the headphone, the sound signal of the external environment, when the user talks through the headphone.

As an implementation, the at least one processor is further caused to carry out actions, including: denoising the voice signal from the user collected by the second microphone according to the sound signal of the external environment.

As an implementation, the at least one processor carrying out the action of identifying the feature audio of the sound signal and determining whether the feature audio matches the preset sound model is caused to carry out actions, including at least one of: extracting noise information in the sound signal and determining whether the noise information matches a preset noise model; extracting voiceprint information in the sound signal and determining whether the voiceprint information matches a sample voiceprint information; extracting sensitive information in the sound signal, determining whether the sensitive information matches a preset keyword.

As an implementation, the at least one processor carrying out the action of reminding the user in the preset reminding manner corresponding to the feature audio is caused to carry out actions, including: determining the preset reminding manner corresponding to the feature audio according to a correspondence between feature audio and preset reminding manners, the preset reminding manner including at least one of preset reminder content display-remind, vibration-remind, display-remind, and simulation-remind; and reminding the user in the preset reminding manner determined.

As an implementation, the at least one speaker includes a first speaker and a second speaker, and the at least one processor is further caused to carry out actions, including: acquiring a sound signal collected by the second microphone, the first speaker, and the second speaker of the headphone; acquiring location information of the sound signal relative to the headphone according to time delays of receiving the sound signal by the second microphone, the first speaker, and the second speaker; reminding the user according to the location information.

As an implementation, the at least one processor carrying out the action of acquiring the location information of the sound signal relative to the headphone according to time delays of receiving the sound signal by the second microphone, the first speaker, and the second speaker is caused to carry out actions, including: acquiring three time delays by using the second microphone, the first speaker, and the second speaker respectively as a reference microphone; acquiring an average time delay according to the tree time delays; estimating the location information of the sound signal according to the average time delay and acquiring the location information of the sound signal relative to the headphone.

As an implementation, the at least one speaker includes a first speaker and a second speaker, and the at least one processor is further caused to carry out actions, including: acquiring a sound signal collected by the first microphone, the first speaker, and the second speaker of the headphone; acquiring location information of the sound signal relative to the headphone according to time delays of receiving the sound signal by the first microphone, the first speaker, and the second speaker; reminding the user according to the location information.

Disclosed herein are implementations of a non-transitory computer-readable storage medium storing a computer program which, when executed by a processor, causes the processor to carry out actions, including: collecting, via an electroacoustic transducer of a headphone, a sound signal of external environment when a user talks through the headphone; identifying feature audio of the sound signal and determining whether the feature audio matches a preset sound model; reminding the user in a preset reminding manner corresponding to the feature audio based on a determination that the feature audio matches the preset sound model.

Figure 1:
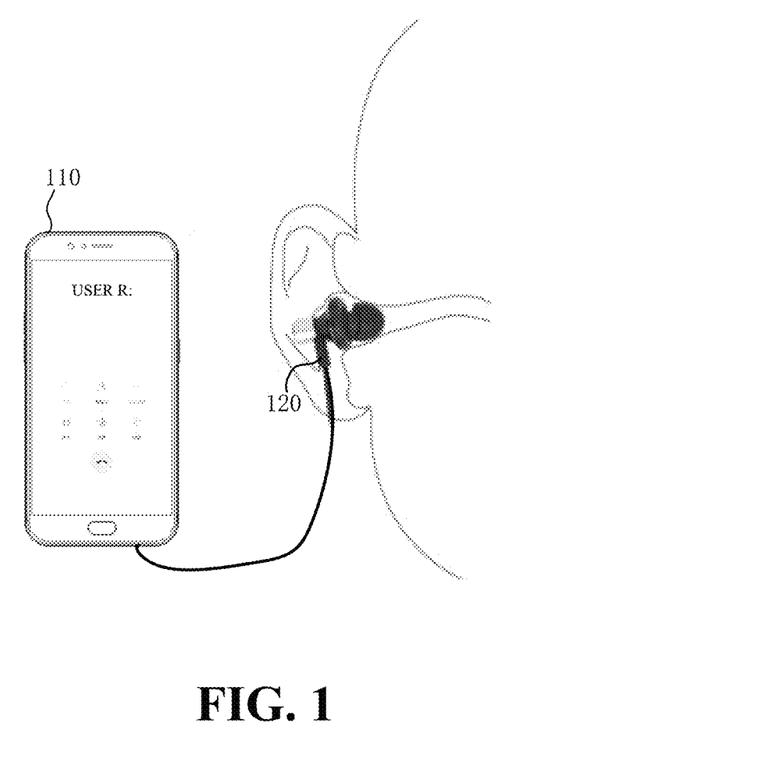
FIG. 1 is a schematic diagram illustrating an application scenario of a method for processing signals according to an implementation of the present disclosure.

FIG. 1 is a schematic diagram illustrating an application scenario of a method for processing signals according to an implementation of the present disclosure. As illustrated in FIG. 1, the application scenario relates to a terminal device 110 and a headphone 120 in communication with the terminal device 110.

The terminal device 110 is in communication with the headphone 120. The headphone 120 includes, but is not limited to, an in-ear headphone and an earplug-type headphone. The terminal device 110 can communicate with the headphone 120 in a wired or wireless manner to transmit data.

The terminal device 110 plays an audio signal. The audio signal includes music, video sound, talking voices, and the like. The audio signal played by the terminal device 110 is transmitted to a user's ear through the headphone 120 to make the user hear the audio signal. The headphone 120 is configured to collect an audio signal. The audio signal includes a voice signal of the user, a sound signal of external environment, or the like. An audio signal collected by the headphone 120 is transmitted to the terminal device 110 for processing. The audio signal collected by the headphone 120 can be configured for talking voices, sound instructions, noise reduction, and the like.

The headphone 120 includes an electroacoustic transducer.

As one implementation, the electroacoustic transducer includes a second microphone, a first speaker (for example, a left speaker), and a second speaker (for example, a right speaker). Any one of the first speaker and the second speaker is located at a tip portion of the headphone 120. When the tip portion of the headphone 120 is disposed into the ear canal of the user, the first speaker and the second speaker output the audio signal played by the terminal device 110 to the ear canal of the user. Any of the first speaker and the second speaker is configured to play an audio signal transmitted by the terminal device 110. The second microphone is configured to collect a voice signal from the user. As one implementation, the electroacoustic transducer further includes a first microphone. The first microphone is configured to record an audio signal around the headphone 120. As an implementation, a speaker (the first speaker or the second speaker) is integrated with the first microphone.

Figure 2:
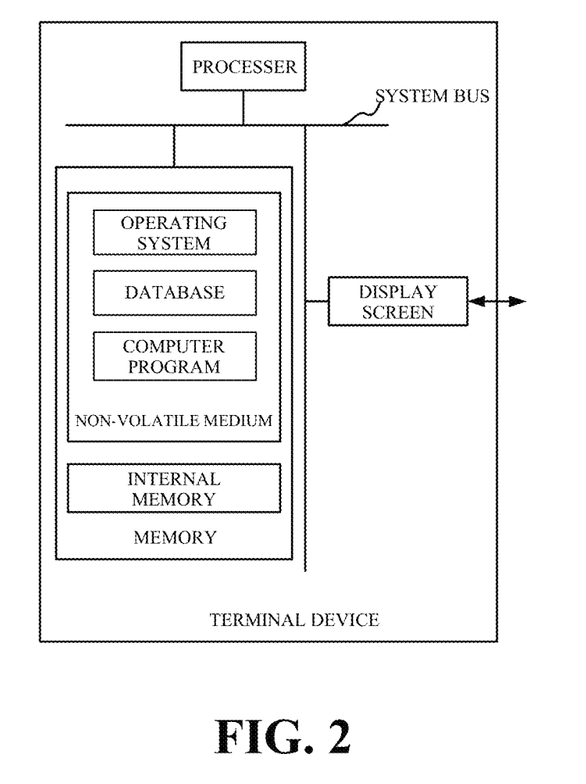
FIG. 2 is a schematic structural diagram illustrating an inner structure of a terminal device according to an implementation of the present disclosure.

FIG. 2 is a schematic structural diagram illustrating an inner structure of a terminal device according to an implementation of the present disclosure. The terminal device 110 includes a processor, a memory, and a display screen. The processor, the memory, and the display screen are coupled via a system bus. The processor is configured to provide computation and control functions to support operation of the entire terminal device 110. The memory is configured to store data, programs, instructions, and the like. The memory stores at least one computer program operable with the processor to implement the method for processing signals applicable to the terminal device 110 according to the implementations of the present disclosure. The memory includes a magnetic disk, a compact disk, a read-only memory (ROM), and other non-volatile medium or a random-access-memory (RAM), and the like. As an implementation, the memory includes a non-volatile medium and an internal memory. The non-volatile medium is configured to store an operating system, a database, and computer programs. The database is configured to store related data to implement the method for processing signals provided by the implementations of the present disclosure. The computer programs are operable with the processer to implement the method for processing signals of the implementations of the present disclosure. The internal memory is configured to provide a cached operating environment for the operating system, the database, and the computer programs in the non-volatile medium. The display screen includes a touch screen, such as a capacitive screen or an electronic screen. The display screen is configured to display interfaces of the terminal device 110. The display screen is operable in a screen-on status and a screen-off status. The terminal device 110 includes a mobile phone, a tablet computer, a personal digital assistant (PDA), a wearable device, and the like.

Those skilled in the art can understand that the structure illustrated in the block diagram of FIG. 2 is only a partial structure related to the present disclosure, and does not constitute any limitation on the terminal device 110 to which the technical solutions of the present disclosure are applied. The terminal device 110 may include more or fewer components than illustrated in the figures or have different component layout, or certain components can be combined.

Figure 3A:
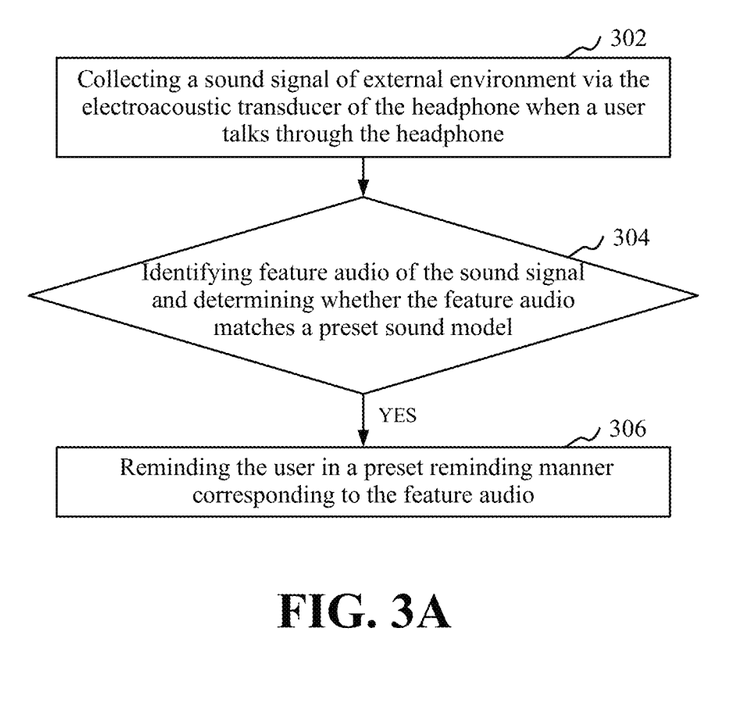
FIG. 3A is a schematic flow chart illustrating a method for processing signals according to an implementation of the present disclosure.

FIG. 3A is a schematic flow chart illustrating a method for processing signals according to an implementation of the present disclosure. The method for processing signals in the implementation is running on the terminal device or the headphone in FIG. 1 as an example. The method is applicable to the headphone in communication with a terminal device. The headphone includes an electroacoustic transducer. The electroacoustic transducer is configured to play and collect an audio signal. The method includes the following operations at blocks 302 to 306.

At block 302, a sound signal of external environment is collected via the electroacoustic transducer of the headphone when a user talks through the headphone.

As an implementation, the electroacoustic transducer includes a second microphone and at least one speaker. The headphone can communicate with the terminal device in a wired or wireless manner. When the user talks through the headphone, the terminal device transmits an audio signal of a calling party to the user's ear through the headphone, and collects a voice signal of the user by the second microphone of the headphone. When the user talks through the headphone, the terminal device collects the sound signal of the external environment by the at least one speaker configured to play an audio signal of the headphone. As an implementation, the electroacoustic transducer includes a second microphone, a first microphone, and at least one speaker. When the user talks through the headphone, the terminal device collects the sound signal of the external environment by the first microphone.

As an implementation, the second microphone of the headphone is usually disposed close to the user's lips, so that it is easy to collect the voice signal of the user when the user is speaking. When the user is not speaking through the headphone, the second microphone of the headphone is in an idle state, so that the sound signal of the external environment can be acquired via the second microphone. When the user is speaking through the headphone, the second microphone of the headphone is occupied, so that the sound signal of the external environment cannot be acquired via the second microphone. In this case, the sound signal of the external environment is collected via the at least one speaker of the headphone.

The at least one speaker of the headphone includes a first speaker and a second speaker. The first speaker and the second speaker can be configured as the left speaker and the right speaker of the headphone respectively and are configured to convert electrical signals corresponding to the audio signal into acoustic wave signals that the user can hear. In addition, the at least one speaker is very sensitive to acoustic waves. The acoustic waves can cause vibration of a speaker cone and drive a coil coupled with the speaker cone to cut magnetic field lines in a magnetic field of a permanent magnet, thus generate a current that varies with the acoustic waves (a phenomenon of generating the current is called an electromagnetic induction phenomenon in physics). In addition, electromotive forces of the audio signal will be output at two ends of the coil, therefore, the at least one speaker can also collect and record the sound signal of the external environment. That is, the first speaker (left speaker) and the second speaker (right speaker) can also be used as a microphone.

Although different in types, functions, and operation states, electroacoustic transducers all include two basic components, that is, an electrical system and a mechanical vibration system. Inside the electroacoustic transducer, the electrical system and the mechanical vibration system are interconnected by some physical effect to complete energy conversion.

The sound signal of the external environment is collected via the electroacoustic transducer of the headphone. When the user is speaking through the headphone, the sound signal of the external environment is collected by at least one speaker configured to play an audio signal of the headphone. That is, at least one of the first speaker (left speaker) and the second speaker (right speaker) of the headphone periodically collect the sound signal of the external environment. As an implementation, the sound signal may be generated by a speaker, audio equipment, or a generator, or may be talking voices of a person. The sound signal is not limited in the present disclosure.

At block 304, feature audio of the sound signal is identified and whether the feature audio matches a preset sound model is determined.

The feature audio includes, but is not limited to, noise waves, voiceprint information, sensitive information, and the like. Valid information of the sound signal of the external environment is acquired by identifying the feature audio of the sound signal. The preset sound model refers to an audio signal with a specific frequency. The preset sound model includes, but is not limited to, a noise-feature model, a character-feature model, a time-feature model, a location-feature model, and an event-feature model. The present sound model is stored in a database to be invoked and matched when needed. As an implementation, the preset sound model can be added, deleted, modified, and so on according to user habits to adapt to needs of different users.

As an implementation, the noise-feature model includes a sound that needs to be noticed by the user, such as a horn, an alarm, a tapping sound, a cry for help, and the like. The character-feature model includes an audio signal including a name or a nick name of a group of people, a company that the user pays attention to, and the like. The time-feature mode includes an audio signal including numbers and dates. The location-feature model includes an audio signal including the user's country, city, company, home address, or the like.

When the feature audio matches the preset sound model, proceed to block 306.

At block 306, remind the user in a preset reminding manner corresponding to the feature audio.

Remind the user in the preset reminding manner corresponding to the feature audio based on a determination that the feature audio matches the preset sound model.

As an implementation, the preset reminding manner corresponding to the feature audio is determined by invoking a correspondence between feature audio and preset reminding manners. Remind the user in the preset reminding manner determined. The preset reminding manner includes, but is not limited to, preset reminder content display-remind, vibration-remind, display-remind, and simulation-remind.

According to the method for processing signals mentioned above, the sound signal of the external environment is collected via the electroacoustic transducer of the headphone when the user talks through the headphone. The feature audio of the sound signal is identified and whether the feature audio matches the preset sound model is determined. Remind the user in the preset reminding manner corresponding to the feature audio based on the determination that the feature audio matches the preset sound model. By means of the method, the sound signal of the external environment can be collected and identified by using inherent components of the headphone, such that the user can be aware of surrounding events when talking through the headphone. The security and convenience in the process of using the headphone can be improved and a better user experience can be provided.

Figure 3B:
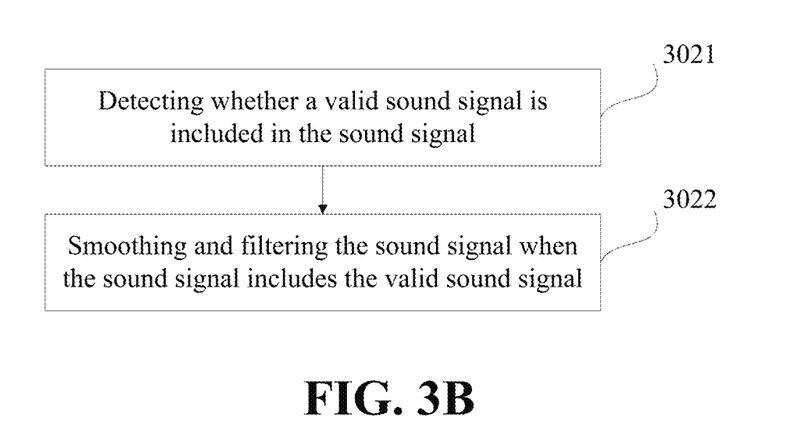
FIG. 3B is a schematic flow chart illustrating a method for processing signals according to an implementation of the present disclosure.

As an implementation, as illustrated in FIG. 3B, after the sound signal of the external environment is collected via the at least one speaker of the headphone, the method further includes the following.

At block 3021, whether a valid sound signal is included in the sound signal is detected.

Existence of environmental noise leads to noise in the sound signal collected. It is necessary to distinguish the valid sound signal from the sound signal to avoid an influence of noise on an estimation of time delay. The valid sound signal can refer to feature audio of the sound signal.

A short-time zero-crossing rate refers to the number of times a waveform acquisition value is abnormal in a certain frame of the sound signal. In a valid sound signal segment, the short-time zero-crossing rate is low, and in a noise segment or a silence segment, the short-time zero-crossing rate is relatively high. Whether the sound signal contains the valid sound signal can be determined by detection of the short-time zero-crossing rate.

As an implementation, whether the sound signal includes the valid sound signal can also be determined by detection of short-time energy.

At block 3022, the sound signal is smoothed and filtered when the sound signal includes the valid sound signal.

When there is the valid sound signal in the sound signal, the sound signal may be smoothed by windowing and framing. "Framing" is configured to divide the sound signal into multiple frames of the sound signal according to a same time period, so that each frame becomes more stable. The windowing and framing is configured to weight each frame of the sound signal by a window function. As an implementation, a Hamming window function which has lower side-lobe may be adopted.

Frequencies of a noise signal may be distributed throughout a frequency space. Filtering refers to a process of filtering signals at a specific frequency band in the sound signal, so as to preserve signals at the specific frequency band and to attenuate signals at other frequency bands. The smoothed sound signal can be clearer after filtering.

Figure 4:
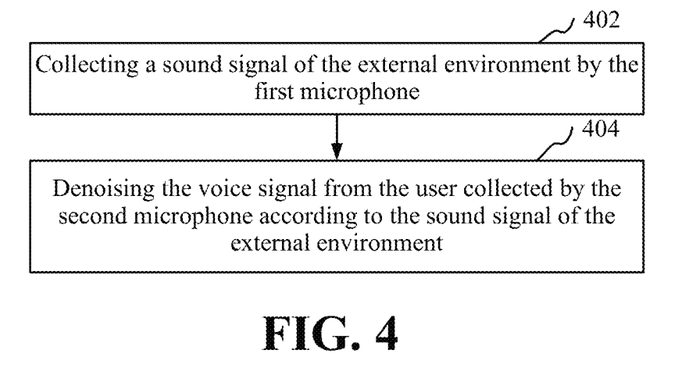
FIG. 4 is a schematic flow chart illustrating a method for processing signals according to another implementation of the present disclosure.

As an implementation, the headphone further includes a first microphone close to the at least one speaker of the headphone. As illustrated in FIG. 4, the method further includes the following operations at blocks 402 to 404.

At block 402, a sound signal of the external environment is collected by the first microphone.

The second microphone of the headphone is usually disposed close to the user's lips, so that it is easy to collect a voice signal of the user when the user is speaking via the second microphone. When the user talks through the headphone, the second microphone of the headphone is occupied, so that the sound signal of the external environment cannot be acquired. In this case, the sound signal of the external environment can be collected by the first microphone of the headphone. At least one of the terminal device and headphone remind the user according to the sound signal collected by the first microphone.

At block 404, the voice signal from the user collected by the second microphone is denoised according to the sound signal of the external environment.

As an implementation, an audio signal collected by the second microphone of the headphone is denoised according to the sound signal of the external environment collected by the first microphone or at least one speaker, so as to eliminate an environmental noise collected by the second microphone of the headphone. In this way, when collecting a voice signal of the user, the second microphone of the headphone can transmit the voice signal to the calling party more clearly, thereby improving the voice quality during a call.

As an implementation, an audio signal played by the at least one speaker of the headphone is denoised according to the sound signal of the external environment collected by the first microphone. The first microphone collects the sound signal of the external environment, and generates an anti-noise waveform according to the sound signal. The anti-noise waveform is played by the at least one speaker of the headphone, thereby achieving an effect of canceling an environmental noise.

As an implementation, the feature audio of the sound signal is identified and whether the feature audio matches a preset sound model is determined is achieved as at least one of the following. Noise information in the sound signal is extracted and whether the noise information matches a preset noise model is determined. Voiceprint information in the sound signal is extracted and whether the voiceprint information matches a sample voiceprint information is determined. Sensitive information in the sound signal is extracted and whether the sensitive information matches a preset keyword is determined.

As an implementation, when it is identified that the sound signal includes a horn, the feature audio of the sound signal is determined to match the preset sound model. As an implementation, if user A stores an audio of a user's name "A" and an audio of a user's name "B" as feature audio, when a person calls out "A" or "B" and a similarity between the feature audio stored and what the person calls reaches a preset level, it can be determined that the sound signal of the external environment includes the feature audio. When the sound signal of the external environment includes the feature audio, the feature audio of the sound signal is determined to match the preset sound model.

Figure 5:
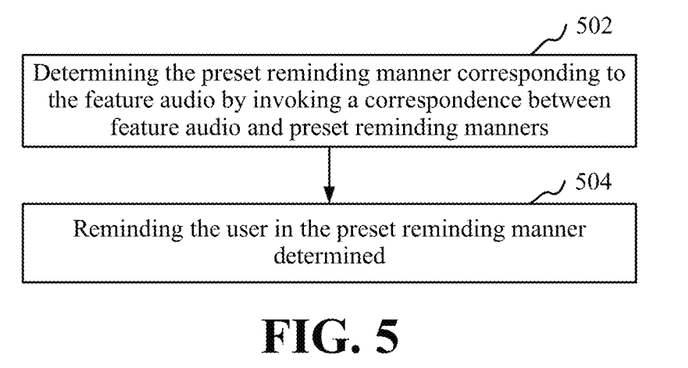
FIG. 5 is a schematic flow chart illustrating a method for processing signals according to another implementation of the present disclosure.

As an implementation, as illustrated in FIG. 5, the operation of reminding the user in the preset reminding manner corresponding to the feature audio includes the following operations at blocks 502 to 504.

At block 502, the preset reminding manner corresponding to the feature audio is determined by invoking a correspondence between feature audio and preset reminding manners.

The feature audio includes, but is not limited to, a character-feature audio, a time-feature audio, a location-feature audio, and an event-feature audio. The preset reminding manners can be determined according to preset priorities of the feature audio. The priorities in a descending order may be: the event-feature audio, a name or a nickname of the user in the character-feature audio, a name or a nickname of a person or a company that the user pays attention to in the character-feature audio, the time-feature audio, the location-feature audio. The preset reminding manner corresponding to the feature audio is determined according to the correspondence between feature audio and preset reminding manners.

At block 504, remind the user in the preset reminding manner determined.

As an implementation, the preset reminding manner includes a first reminding manner and a second reminding manner. The first reminding manner is headphone-remind, that is, the user is reminded by playing certain specific recordings through the headphone and transmitting the certain specific recordings to the user's ear. The second reminding manner is terminal-remind, and the terminal device is in communication with the headphone. As an implementation, the terminal-remind includes interface display-remind, a combination of interface display-remind and ring-remind, a combination of interface display-remind and vibration-remind, or the like. Various reminding manners that can be conceived by those skilled in the art should be included in the implementations of the present disclosure.

Figure 6:
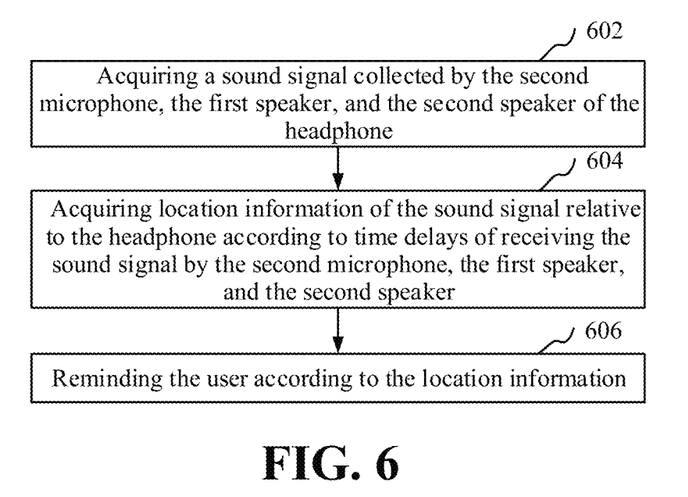
FIG. 6 is a schematic flow chart illustrating a method for processing signals according to another implementation of the present disclosure.

As an implementation, as illustrated in FIG. 6, the electroacoustic transducer includes a first speaker and a second speaker, and the method includes the following operations at blocks 602 to 606.

At block 602, a sound signal collected by the second microphone, the first speaker, and the second speaker of the headphone are acquired.

As an implementation, when the second microphone of the headphone is not collecting a voice signal of the user, the sound signal of the external environment can be collected by the second microphone, the first speaker, and the second speaker of the headphone. As an implementation, when the headphone are provided with a first microphone, the sound signal of the external environment can be collected by the first microphone, the first speaker, and the second speaker of the headphone.

At block 604, location information of the sound signal relative to the headphone is acquired, according to time delays of receiving the sound signal by the second microphone, the first speaker, and the second speaker.

As an implementation, the sound signal is received by the second microphone, the first speaker, and the second speaker. Time delays of receiving the sound signal are acquired by using the second microphone, the first speaker, and the second speaker respectively as a reference microphone. The location information of the sound signal is estimated according to time delay estimation techniques based on arrival time delay difference to acquire the location information of the sound signal relative to the headphone. The location information can be understood as distance information of the sound signal relative to the headphone and orientation information relative to the headphone.

As an implementation, when the headphone are provided with a first microphone, the sound signal of the external environment can be collected by the first microphone, the first speaker, and the second speaker of the headphone. The sound signal is received by the first microphone, the first speaker, and the second speaker. Time delays of receiving the sound signal are acquired by using the first microphone, the first speaker, and the second speaker respectively as a reference microphone. The location information of the sound signal is estimated according to time delay estimation techniques based on arrival time delay difference to acquire the location information of the sound signal relative to the headphone. The location information can be understood as distance information of the sound signal relative to the headphone and orientation information relative to the headphone.

As an implementation, the location information of the sound signal relative to the headphone can be understood as location information of the sound signal relative to a center position of the headphone (the center position of the headphone may refer to a center position of the second microphone, the first speaker, and the second speaker; or the center position of the headphone may refer to a center position of the first microphone, the first speaker, and the second speaker). As an implementation, the location information of the sound signal relative to the headphone can be understood as location information of the sound signal relative to the second microphone (or the first microphone), the first speaker, or the second speaker. As an implementation, the location information of the sound signal relative to the headphone can also be understood as location information of the sound signal relative to any reference point on the headphone.

As an implementation, according to the sound signal received by the second microphone (or the first microphone), the first speaker, and the second speaker, the sound signal is located by directional technologies based on high-resolution spectral estimation. As an implementation, the sound signal is located by controllable beam forming technologies. As an implementation, the sound signal is located by adopting location technologies based on amplitude ratio of sound pressure.

At block 606, remind the user according to the location information.

When the sound signal meets a preset reminding condition, the user can be reminded according to preset reminding content corresponding to the location information. The preset reminding condition includes at least one of decibel values of the sound signal being greater than a preset value, the sound signal including some preset feature audio such as a horn, an alarm, a cry, a specific person name, place name, time, and the like. According to the location information of the sound signal relative to the headphone acquired, a distance signal and an orientation signal of the sound signal relative to the headphone can be acquired. Different reminding manners can be set according to the location information. When the sound signal meets the preset reminding condition, the user is reminded in a reminding manner corresponding to the location information.

As an implementation, the preset reminding manner corresponding to a current level is determined according to priorities of the feature audio. For instance, feature audio with a high priority corresponds to a first reminding manner, and feature audio with a low priority corresponds to a second reminding manner. For example, when someone calls out the user's name A" or the user's name "B", the user can be reminded by the headphone according to the feature audio and the location information with a reminding content of "someone is calling out at one meter on the left rear", so that the user can be reminded in time to turn around and talk with the person. When there is a horn, the user can be reminded through the headphone according to the feature audio and the location information with a reminding content of "there is a car three meters on the right rear", so that the user can be reminded in time to be aware of safety in blind area, and heighten his or her vigilance. When someone is talking about "OPPO® phone", the user can be reminded by displaying via an interface of a terminal device according to the feature audio and the location information with reminding content of "one meter ahead, OPPO®, OPPO®, OPPO®", so that the user can be reminded that someone is talking about "OPPO®" one meter ahead. If the user is interested in OPPO®, he or she can stay for a while to get relevant information, and so on.

According to the method for processing signals according to the implementations, when the sound signal meets the preset reminding condition, the user can be reminded through the headphone in a preset reminding manner according to the feature audio and the location information of the sound signal. The users can deal with the sound signal accurately and immediately to avoid missing important or urgent things.

Figure 7:
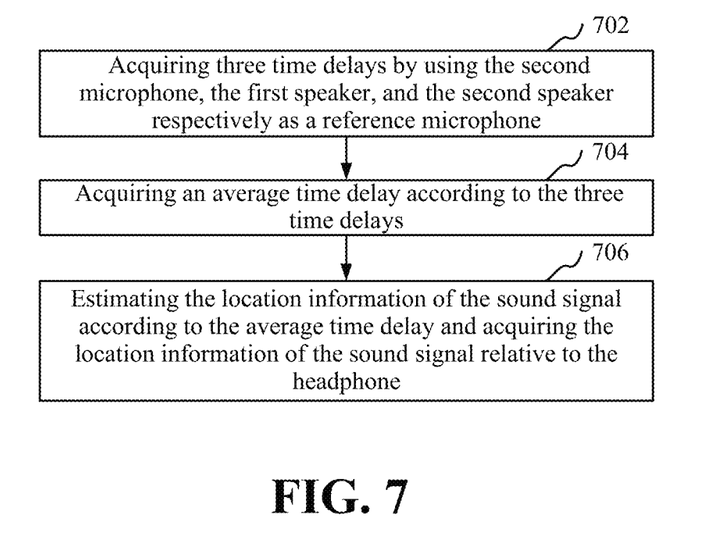
FIG. 7 is a schematic flow chart illustrating a method for processing signals according to another implementation of the present disclosure.

As an implementation, as illustrated in FIG. 7, the operation that the location information of the sound signal relative to the headphone is acquired according to the time delays of receiving the sound signal by the second microphone, the first speaker, and the second speaker includes the following operations at block 702 to 704.

At block 702, three time delays are acquired by using the second microphone, the first speaker, and the second speaker respectively as a reference microphone.

The sound signal can also be called an acoustic wave signal or acoustic signal. During acoustic wave propagation, since distance from sound source to the second microphone, the first speaker, and the second speaker is different, so time when the acoustic signal reaches the second microphone, the first speaker, and the second speaker is different. A time interval at which the sound signal reaches any two of the second microphone, the first speaker, and the second speaker is called a time delay.

The second microphone, the first speaker (left speaker), and the second speaker (right speaker) are fixed on the headphone, so that a coordinate system based on the headphone can be established. Positions of the second microphone, the first speaker, and the second speaker in the coordinate system are known. In addition, distances between any two of the second microphone, the first speaker (left speaker), and the second speaker (right speaker) are also known. According to the propagation speed of sound waves in the air, the time interval at which the sound signal reaches any two of the second microphone, the first speaker, and the second speaker can be calculated.

As an implementation, for the convenience of description, the second microphone, the first speaker, and the second speaker are referred to as microphones, and are respectively represented by M1, M2, and M3. The time delay (time interval) at which the sound signal reaches any two microphones (a pair of microphones) is acquired by using the microphone M1, microphone M2, and microphone M3 respectively as a reference microphone. In this way, three different time delays are acquired. Peak offsets of cross-correlation functions of amplitudes of the acoustic signal received by the microphones M1, M2, and M3 can be acquired. The three time delays are then estimated according to a sampling frequency of the acoustic signal.

At block 704, an average time delay is acquired according to the three time delays.

A weighted average value is acquired according to the three time delays. The weighted average value is determined as the average time delay.

At block 706, the location information of the sound signal is estimated according to the average time delay and the location information of the sound signal relative to the headphone is acquired.

The location information of the sound signal can be estimated according to the average time delay and known positions of the microphones M1, M2, and M3. The location information of the sound signal relative to the headphone, that is, distance information and orientation information from sound resource of the sound signal to the headphone, is acquired.

According to the method in the implementations of the present disclosure, by using the microphones M1, M2, and M3 respectively as the reference microphone, the three time delays between the reference microphone and another microphone are acquired. A weighted average value is acquired according to the three time delays. The sound signal is located according to the weighted average value, which can improve a locating accuracy.

It should be understood that although the various steps in the flow charts of FIGS. 3-7 are sequentially illustrated as indicated by the arrows, these steps are not necessarily performed in the order indicated by the arrows. Except as explicitly stated herein, the execution of these steps is not strictly limited, and the steps may be performed in other orders. Moreover, at least some of the steps in FIGS. 3-7 may include multiple sub-steps or multiple stages, which are not necessarily performed at the same time, and can be performed at different times, the order of execution of these sub-steps or stages is not necessarily performed sequentially, and can be performed in turn or alternately with at least a part of other steps or sub-steps or stages of other steps.

The method for processing signals provided in the implementations in FIGS. 3-7 can be running on the terminal device or the headphone.

Figure 8:
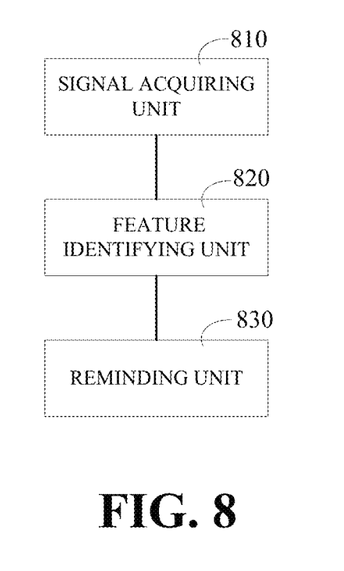
FIG. 8 is a schematic structural diagram illustrating an apparatus for processing signals according to an implementation of the present disclosure.

As illustrated in FIG. 8, As an implementation, an apparatus for processing signals is provided. The apparatus includes a signal acquiring unit 810, a feature identifying unit 820, and a reminding unit 830.

The signal acquiring unit 810 is configured to collect a sound signal of external environment via an electroacoustic transducer of a headphone when a user talks through the headphone.

The feature identifying unit 820 is configured to identify feature audio of the sound signal and to determine whether the feature audio matches a preset sound model.

The reminding unit 830 is configured to remind the user in a preset reminding manner corresponding to the feature audio.

As an implementation, the electroacoustic transducer includes a second microphone configured to collect a voice signal from the user and at least one speaker configured to play an audio signal.

The signal acquiring unit 810 is further configured to collect the sound signal of the external environment by at least one speaker of the headphone when the user talks through the headphone.

As an implementation, the electroacoustic transducer includes a second microphone configured to collect a voice signal from the user, at least one speaker configured to play an audio signal, and a first microphone close to the at least one speaker of the headphone. The signal acquiring unit 810 is further configured to collect the sound signal of the external environment by the first microphone.

As an implementation, the sound signal of the external environment by the first microphone is further used for denoising the voice signal from the user collected by the second microphone according to the sound signal of the external environment.

As an implementation, the feature identifying unit 820 is further configured to at least one of: extract noise information in the sound signal and determine whether the noise information matches a preset noise model, to extract voiceprint information in the sound signal and determine whether the voiceprint information matches a sample voiceprint information, and to extract sensitive information in the sound signal and determine whether the sensitive information matches a preset keyword.

As an implementation, the reminding unit 830 is further configured to determine the preset reminding manner corresponding to the feature audio according to a correspondence between feature audio and preset reminding manners, and to remind the user in the preset reminding manner determined. The preset reminding manner includes at least one of preset reminder content display-remind, vibration-remind, display-remind, and simulation-remind.

As an implementation, the at least one speaker includes a first speaker and a second speaker. The reminding unit 830 is further configured to acquire a sound signal collected by the second microphone, the first speaker, and the second speaker of the headphone, to acquire location information of the sound signal relative to the headphone according to time delays of receiving the sound signal by the microphone, the first speaker, and the second speaker, and to remind the user according to the location information.

As an implementation, the apparatus for processing signals further includes a location acquiring unit. The location acquiring unit is configured to acquire three time delays by using the microphone, the first speaker, and the second speaker respectively as a reference microphone, to acquire an average time delay according to the tree time delays, to estimate the location information of the sound signal according to the average time delay, and to acquire the location information of the sound signal relative to the headphone.

The division of each unit in the above-mentioned apparatus for processing signals is for illustrative purposes only. In other implementations, the apparatus for processing signals may be divided into different units as needed to complete all or part of the functions of the above-mentioned apparatus for processing signals.

For the specific definition of the apparatus for processing signals, reference may be made to the definition of the method for processing signals, and details are not described herein again. Each of the above-described apparatus for processing signals can be implemented in whole or in part by software, hardware, and combinations thereof. Each of the above units may be embedded in or independent of a processor in a computer device, or may be stored in a memory in the computer device in a software form, so that the processor can invoke and implement the operations corresponding to the above units.

The implementation of each unit in the apparatus for processing signals provided in the implementations of the present disclosure may be in the form of a computer program. The computer program can run on a terminal or server. The program units of the computer program can be stored in the memory of the terminal or server. When the computer program is executed by the processor, the operations of the method for processing signals described in the implementations of the present disclosure are implemented.

Implementations of the disclosure further provide a headphone. The headphone includes an electroacoustic transducer, a memory, a processor, and computer programs. The computer programs are stored in the memory and can be executed by the processor. The processor is electrically coupled with the electroacoustic transducer and the memory, and the computer programs, when executed by the processor, are configured to implement the method for processing signals provided in the above-mentioned implementations.

Implementations of the disclosure further provide a non-transitory computer readable storage medium. One or more non-transitory computer readable storage media contain computer executable instructions which, when executed by one or more processors, are operable with the processor to implement the method for processing signals provided in the above-mentioned implementations.

Implementations of the disclosure further provide a computer program product. The computer program product contains instructions which, when executed by the computer, are operable with the computer to implement the method for processing signals provided in the above-mentioned implementations.

Figure 9:
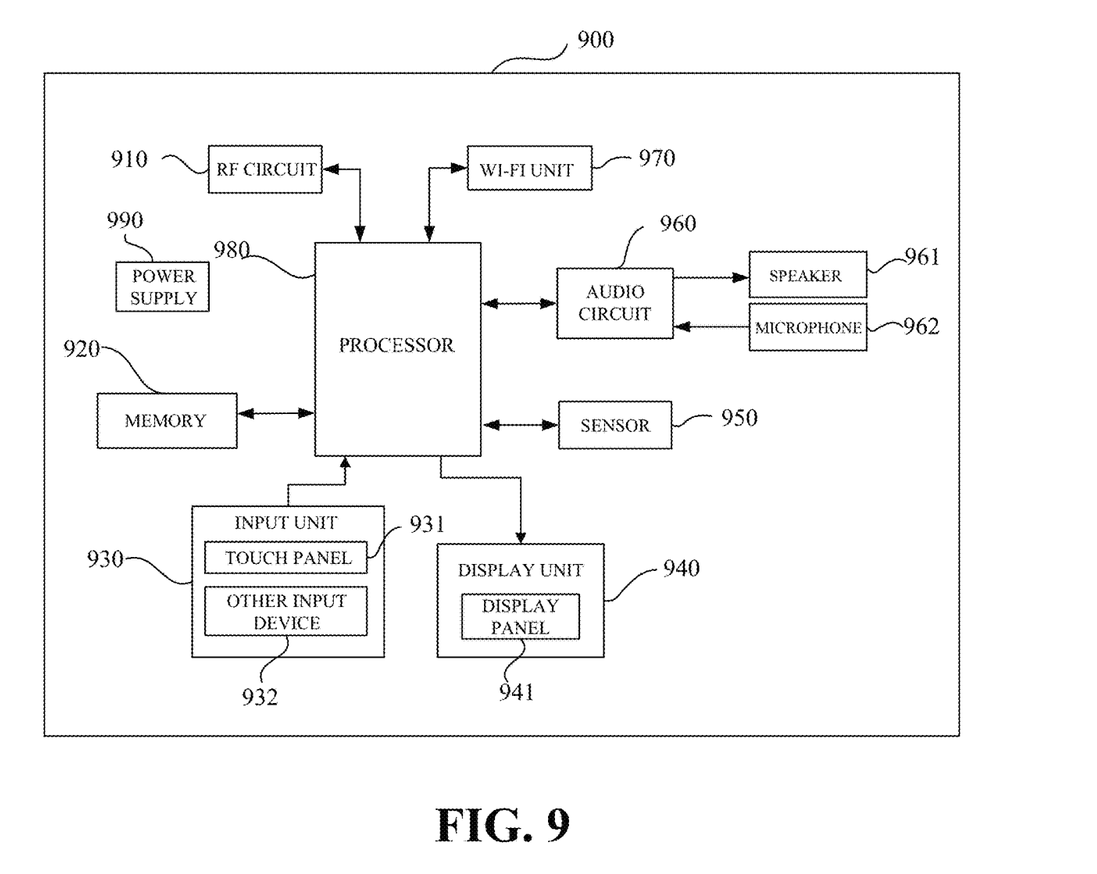
FIG. 9 is a schematic structural diagram illustrating a partial structure of a mobile phone related to a terminal device according to implementations of the present disclosure.

Implementations of the disclosure further provide a terminal device. As illustrated in FIG. 9, only parts related to the implementations of the present disclosure are illustrated for ease of description. For technical details not described, reference may be made to the method implementations of the present disclosure. The terminal device may be any terminal device, such as a mobile phone, a tablet computer, a PDA, a point of sale terminal (POS), an on-board computer, a wearable device, and the like. The following describes the mobile phone as an example of the terminal device.

FIG. 9 is a block diagram of a partial structure of a mobile phone related to a terminal device according to an implementation of the present disclosure. As illustrated in FIG. 9, the mobile phone includes a radio frequency (RF) circuit 910, a memory 920, an input unit 930, a display unit 940, a sensor 950, an audio circuit 960, a wireless fidelity (Wi-Fi) unit 970, a processor 980, a power supply 990, and other components. Those skilled in the art can understand that the structure of the mobile phone illustrated in FIG. 9 does not constitute any limitation on the mobile phone. The mobile phone configured to implement technical solutions of the disclosure may include more or fewer components than illustrated or may combine certain components or different components.

The RF circuit 910 is configured to receive or transmit information, or receive or transmit signals during a call. In one implementation, the RF circuit 910 is configured to receive downlink information of a base station, which will be processed by the processor 980. In addition, the RF circuit 910 is configured to transmit uplink data to the base station. Generally, the RF circuit 910 includes, but is not limited to, an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes, but is not limited to, global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and units. The processor 980 is configured to execute various function applications and data processing of the mobile phone by running the software programs and the units stored in the memory 920. The memory 920 mainly includes a program storage area and a data storage area. The program storage area may store an operating system, applications required for at least one function (such as sound playback function, image playback function, etc.). The data storage area may store data (such as audio data, a phone book, etc.) created according to use of the mobile phone, and so on. In addition, the memory 920 may include a high-speed RAM, and may further include a non-transitory memory such as at least one disk storage device, a flash device, or other non-transitory solid storage devices.

The input unit 930 may be configured to receive input digital or character information and to generate key signal input associated with user setting and function control of the mobile phone 900. As one implementation, the input unit 930 may include a touch panel 931 and other input devices 932. The touch panel 931, also known as a touch screen, is configured to collect touch operations generated by the user on or near the touch panel 931 (such as operations generated by the user using any suitable object or accessory such as a finger or a stylus to touch the touch panel 931 or areas near the touch panel 931), and to drive a corresponding connection device according to a preset program. In one implementation, the touch panel 931 may include two parts of a touch detection device and a touch controller. The touch detection device is configured to detect the user's touch orientation and a signal brought by the touch operation, and to transmit the signal to the touch controller. The touch controller is configured to receive the touch information from the touch detection device, to convert the touch information into contact coordinates, and to transmit the contact coordinates to the processor 980 again. The touch controller can also receive and execute commands from the processor 980. In addition, the touch panel 931 may be implemented in various types such as resistive, capacitive, infrared, and surface acoustic waves. In addition to the touch panel 931, the input unit 930 may further include other input devices 932. The input devices 932 include, but are not limited to, one or more of a physical keyboard, function keys (such as volume control buttons, switch buttons, etc.).

The display unit 940 is configured to display information input by the user, information provided for the user, or various menus of the mobile phone. The display unit 940 may include a display panel 941. In one implementation, the display panel 941 may be in the form of a liquid crystal display (LCD), an organic light-emitting diode (OLED), and so on. The touch panel 931 may cover the display panel 941. After the touch panel 931 detects a touch operation on or near the touch panel 931, the touch panel 931 transmits the touch operation to the processor 980 to determine a type of the touch event, and then the processor 980 provides a corresponding visual output on the display panel 941 according to the type of the touch event. Although in FIG. 9, the touch panel 931 and the display panel 941 function as two independent components to implement input and output functions of the mobile phone, in some implementations, the touch panel 931 and the display panel 941 may be integrated to achieve the input and output functions of the mobile phone.

The mobile phone 900 may also include at least one sensor 950, such as a light sensor, a motion sensor, and other sensors. As one implementation, the light sensor may include an ambient light sensor and a proximity sensor, among which the ambient light sensor may adjust the brightness of the display panel 941 according to ambient lights, and the proximity sensor may turn off at least one of the display panel 941 and a backlight when the mobile phone reaches nearby the ear. As a kind of motion sensor, an accelerometer sensor can detect magnitude of acceleration in all directions, and when the mobile phone is stationary, the accelerometer sensor can detect the magnitude and direction of gravity, which can be used for applications which requires mobile-phone gestures identification (such as vertical and horizontal screen switch), or can be used for vibration-recognition related functions (such as a pedometer, percussion), and so on. In addition, the mobile phone can also be equipped with a gyroscope, a barometer, a hygrometer, a thermometer, an infrared sensor, and other sensors.

The audio circuit 960, a speaker 961, and a microphone 962 may provide an audio interface between the user and the mobile phone. The audio circuit 960 may convert the received audio data into electrical signals and transmit the electrical signals to the speaker 961; thereafter the speaker 961 may convert the electrical signals into a sound signal to output. On the other hand, the microphone 962 may convert the received a sound signal into electrical signals, which will be received and converted into audio data by the audio circuit 960 to output to the processor 980. The audio data may then be processed and transmitted by the processor 980 via the RF circuit 910 to another mobile phone. The audio data may be output to the memory 920 for further processing.

Wi-Fi belongs to a short-range wireless transmission technology. With aid of the Wi-Fi unit 970, the mobile phone may assist the user in E-mail receiving and sending, webpage browsing, access to streaming media, and the like. Wi-Fi provides users with wireless broadband Internet access. Although the Wi-Fi unit 970 is illustrated in FIG. 9, it should be understood that the Wi-Fi unit 970 is not essential to the mobile phone 900 and can be omitted according to actual needs.

The processor 980 is a control center of the mobile phone. The processor 980 connects various parts of the entire mobile phone through various interfaces and lines. By running or executing at least one of software programs and units stored in the memory 920 and calling data stored in the memory 920, the processor 980 can execute various functions of the mobile phone and conduct data processing, so as to monitor the mobile phone as a whole. In one implementation, the processor 980 can include at least one processing unit. In one implementation, the processor 980 can be integrated with an application processor and a modem processor, where the application processor is mainly configured to handle an operating system, a user interface, applications, and so on, and the modem processor is mainly configured to deal with wireless communication. It will be appreciated that the modem processor mentioned above may not be integrated into the processor 980. For example, the processor 980 can integrate an application processor and a baseband processor, and the baseband processor and other peripheral chips can form a modem processor. The mobile phone 900 also includes a power supply 990 (e.g., a battery) that supplies power to various components. For instance, the power supply 990 may be logically coupled with the processor 980 via a power management system to enable management of charging, discharging, and power consumption through the power management system.

In an implementation, the mobile phone 900 may include a camera, a Bluetooth unit, and so on.

In the implementations of the present disclosure, the processor included in the mobile phone implements the method for processing signals described above when executing computer programs stored in the memory.

When the computer programs run on the processor are executed, the user can be aware of surrounding events when talking through the headphone. The security and convenience in the process of the user using the headphone can be improved and a better user experience can be provided.

Any reference to a memory, storage, database, or other medium used herein may include at least one of a non-transitory and transitory memories. Suitable non-transitory memories can include ROM, programmable ROM (PROM), electrically programmable ROM (EPROM), electrically erasable programmable ROM (EEPROM), or flash memory. Transitory memory can include RAM, which acts as an external cache. By way of illustration and not limitation, RAM is available in a variety of formats, such as static RAM (SRAM), dynamic RAM (DRAM), synchronous DRAM (SDRAM), double data rate SDRAM (DDR SDRAM), enhanced SDRAM (ESDRAM), synchronization link DRAM (SLDRAM), Rambus direct RAM (RDRAM), direct Rambus dynamic RAM (DRDRAM), and Rambus dynamic RAM (RDRAM).

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing signals, comprising:
   collecting, via an electroacoustic transducer of a headphone, a sound signal of external environment when a user talks through the headphone;
   identifying feature audio of the sound signal and determining whether the feature audio matches a preset sound model; and
   reminding the user in a preset reminding manner corresponding to the feature audio based on a determination that the feature audio matches the preset sound model;
   wherein the electroacoustic transducer comprises at least one speaker configured to play an audio signal; and wherein collecting, via the electroacoustic transducer of the headphone, the sound signal of external environment when the user talks through the headphone comprises: collecting, by the at least one speaker of the headphone, the sound signal of the external environment, when the user talks through the headphone;
   wherein the electroacoustic transducer further comprises a second microphone configured to collect a voice signal from the user; and wherein the method further comprises: denoising the voice signal from the user collected by the second microphone according to the sound signal of the external environment;
   wherein the at least one speaker comprises a first speaker and a second speaker, and the method further comprises: acquiring the sound signal collected by the second microphone, the first speaker, and the second speaker of the headphone; acquiring location information of the sound signal relative to the headphone according to time delays of receiving the sound signal by the second microphone, the first speaker, and the second speaker; and reminding the user according to the location information;
   wherein acquiring the location information of the sound signal relative to the headphone according to the time delays of receiving the sound signal by the second microphone, the first speaker, and the second speaker comprises: acquiring three time delays by using the second microphone, the first speaker, and the second speaker respectively as a reference microphone, wherein a time interval at which the sound signal reaches any two of the second microphone, the first speaker, and the second speaker is called a time delay; acquiring an average time delay according to the three time delays; and estimating the location information of the sound signal according to the average time delay and acquiring the location information of the sound signal relative to the headphone.

2. The method of claim 1, wherein the electroacoustic transducer comprises a first microphone close to the at least one speaker of the headphone; and
   wherein collecting, via the electroacoustic transducer of the headphone, the sound signal of external environment when the user talks through the headphone comprises:
   collecting, by the first microphone of the headphone, the sound signal of the external environment, when the user talks through the headphone.

3. The method of claim 1, wherein identifying the feature audio of the sound signal and determining whether the feature audio matches the preset sound model comprises at least one of:
   extracting noise information in the sound signal and determining whether the noise information matches a preset noise model;
   extracting voiceprint information in the sound signal and determining whether the voiceprint information matches a sample voiceprint information; and
   extracting sensitive information in the sound signal, determining whether the sensitive information matches a preset keyword.

4. The method of claim 1, wherein reminding the user in the preset reminding manner corresponding to the feature audio comprises:
   determining the preset reminding manner corresponding to the feature audio according to a correspondence between feature audio and preset reminding manners, the preset reminding manner comprising at least one of preset reminder content display-remind, vibration-remind, display-remind, and simulation-remind; and
   reminding the user in the preset reminding manner determined.

5. The method of claim 2, further comprising:
   acquiring the sound signal collected by the first microphone, the first speaker, and the second speaker of the headphone;
   acquiring the location information of the sound signal relative to the headphone according to time delays of receiving the sound signal by the first microphone, the first speaker, and the second speaker; and
   reminding the user according to the location information.

6. The method of claim 5, wherein acquiring the location information of the sound signal relative to the headphone according to the time delays of receiving the sound signal by the first microphone, the first speaker, and the second speaker comprises:
  acquiring three time delays by using the first microphone, the first speaker, and the second speaker respectively as a reference microphone;
  acquiring an average time delay according to the three time delays; and
  estimating the location information of the sound signal according to the average time delay and acquiring the location information of the sound signal relative to the headphone.

7. A terminal device, comprising:
  at least one processor; and
  a computer readable storage, coupled to the at least one processor and storing at least one computer executable instruction thereon which, when executed by the at least one processor, cause the at least one processor to carry out actions, comprising:
  collecting, via an electroacoustic transducer of a headphone, a sound signal of external environment when a user talks through the headphone;
  identifying feature audio of the sound signal and determining whether the feature audio matches a preset sound model; and
  reminding the user in a preset reminding manner corresponding to the feature audio based on a determination that the feature audio matches the preset sound model;
  wherein the electroacoustic transducer comprises at least one speaker configured to play an audio signal; and the at least one processor carrying out the action of collecting, via the electroacoustic transducer of the headphone, the sound signal of external environment when the user talks through the headphone is caused to carry out actions, comprising: collecting, by the at least one speaker of the headphone, the sound signal of the external environment, when the user talks through the headphone;
  wherein the at least one processor is further caused to carry out actions, comprising: denoising a voice signal from the user collected by a second microphone according to the sound signal of the external environment;
  wherein the at least one speaker comprises a first speaker and a second speaker, and the at least one processor is further caused to carry out actions, comprising: acquiring the sound signal collected by the second microphone, the first speaker, and the second speaker of the headphone; acquiring location information of the sound signal relative to the headphone according to time delays of receiving the sound signal by the second microphone, the first speaker, and the second speaker; and reminding the user according to the location information;
  wherein the at least one processor carrying out the action of acquiring the location information of the sound signal relative to the headphone according to the time delays of receiving the sound signal by the second microphone, the first speaker, and the second speaker is caused to carry out actions, comprising: acquiring three time delays by using the second microphone, the first speaker, and the second speaker respectively as a reference microphone, wherein a time interval at which the sound signal reaches any two of the second microphone, the first speaker, and the second speaker is called a time delay; acquiring an average time delay according to the three time delays; and estimating the location information of the sound signal according to the average time delay and acquiring the location information of the sound signal relative to the headphone.

8. The terminal device of claim 7, wherein
  the electroacoustic transducer comprises a first microphone close to the at least one speaker of the headphone; and
  the at least one processor carrying out the action of collecting, via the electroacoustic transducer of the headphone, the sound signal of external environment when the user talks through the headphone is caused to carry out actions, comprising:
  collecting, by the first microphone of the headphone, the sound signal of the external environment, when the user talks through the headphone.

9. The terminal device of claim 7, wherein the at least one processor carrying out the action of identifying the feature audio of the sound signal and determining whether the feature audio matches the preset sound model is caused to carry out actions, comprising at least one of:
  extracting noise information in the sound signal and determining whether the noise information matches a preset noise model;
  extracting voiceprint information in the sound signal and determining whether the voiceprint information matches a sample voiceprint information; and
  extracting sensitive information in the sound signal, determining whether the sensitive information matches a preset keyword.

10. The terminal device of claim 7, wherein the at least one processor carrying out the action of reminding the user in the preset reminding manner corresponding to the feature audio is caused to carry out actions, comprising:
  determining the preset reminding manner corresponding to the feature audio according to a correspondence between feature audio and preset reminding manners, the preset reminding manner comprising at least one of preset reminder content display-remind, vibration-remind, display-remind, and simulation-remind; and
  reminding the user in the preset reminding manner determined.

11. The terminal device of claim 8, wherein
  the at least one processor is further caused to carry out actions, comprising:
  acquiring the sound signal collected by the first microphone, the first speaker, and the second speaker of the headphone;
  acquiring the location information of the sound signal relative to the headphone according to time delays of receiving the sound signal by the first microphone, the first speaker, and the second speaker; and
  reminding the user according to the location information.

12. A non-transitory computer-readable storage medium storing a computer program which, when executed by a processor, causes the processor to carry out actions, comprising:
  collecting, via an electroacoustic transducer of a headphone, a sound signal of external environment when a user talks through the headphone;
  identifying feature audio of the sound signal and determining whether the feature audio matches a preset sound model; and reminding the user in a preset reminding manner corresponding to the feature audio based on a determination that the feature audio matches the preset sound model;

wherein the electroacoustic transducer comprises at least one speaker configured to play an audio signal; and wherein the processor carrying out the action of collecting, via the electroacoustic transducer of the headphone, the sound signal of external environment when the user talks through the headphone is caused to carry out actions, comprising: collecting, by the at least one speaker of the headphone, the sound signal of the external environment, when the user talks through the headphone;

wherein the processor is further caused to carry out actions, comprising: denoising a voice signal from the user collected by a second microphone according to the sound signal of the external environment;

wherein the at least one speaker comprises a first speaker and a second speaker, and the processor is further caused to carry out actions, comprising: acquiring the sound signal collected by the second microphone, the first speaker, and the second speaker of the headphone; acquiring location information of the sound signal relative to the headphone according to time delays of receiving the sound signal by the second microphone, the first speaker, and the second speaker; and reminding the user according to the location information;

wherein the processor carrying out the action of acquiring the location information of the sound signal relative to the headphone according to the time delays of receiving the sound signal by the second microphone, the first speaker, and the second speaker is caused to carry out actions, comprising: acquiring three time delays by using the second microphone, the first speaker, and the second speaker respectively as a reference microphone, wherein a time interval at which the sound signal reaches any two of the second microphone, the first speaker, and the second speaker is called a time delay; acquiring an average time delay according to the three time delays; and estimating the location information of the sound signal according to the average time delay and acquiring the location information of the sound signal relative to the headphone.

* * * * *